(12) United States Patent
Schwulst et al.

(10) Patent No.: US 10,056,856 B1
(45) Date of Patent: Aug. 21, 2018

(54) CONTROL STRATEGY FOR AUTOMATIC SHUTDOWN OF ENGINE

(71) Applicant: ELECTROJET TECHNOLOGIES, INC., Brighton, MI (US)

(72) Inventors: Kyle E. E. Schwulst, Whitmore Lake, MI (US); Jesse Beeker, Novi, MI (US)

(73) Assignee: ElectroJet Technologies, Inc., Brighton, MI (US)

( * ) Notice: Subject to any disclaimer, the term of this patent is extended or adjusted under 35 U.S.C. 154(b) by 52 days.

(21) Appl. No.: 15/473,109

(22) Filed: Mar. 29, 2017

(51) Int. Cl.
*H02P 9/02* (2006.01)
*H02K 7/18* (2006.01)
*H02K 11/20* (2016.01)

(52) U.S. Cl.
CPC ............. *H02P 9/02* (2013.01); *H02K 7/1815* (2013.01); *H02K 11/20* (2016.01)

(58) Field of Classification Search
CPC .......... H02P 9/02; H02K 11/20; H02K 7/1815
See application file for complete search history.

(56) References Cited

U.S. PATENT DOCUMENTS

| | | | |
|---|---|---|---|
| 8,249,795 B2 | 8/2012 | Sumilla et al. | |
| 8,601,772 B2 * | 12/2013 | Turpin | F01N 1/00 181/204 |
| 8,972,152 B2 | 3/2015 | Boesch | |
| 9,267,458 B2 * | 2/2016 | Sakaguchi | F02D 41/22 |
| 9,284,920 B2 | 3/2016 | Leone et al. | |
| 9,545,847 B2 | 1/2017 | Honda et al. | |
| 2012/0209500 A1 | 8/2012 | Haskew et al. | |
| 2013/0110376 A1 | 5/2013 | Surnilla et al. | |
| 2015/0175008 A1 | 6/2015 | Honda et al. | |
| 2015/0300172 A1 | 10/2015 | Haskew et al. | |
| 2016/0369730 A1 | 12/2016 | Yoo et al. | |

FOREIGN PATENT DOCUMENTS

DE 102012218572 A1 4/2014

OTHER PUBLICATIONS

Puzinauskas; CO Sensor for Gas Generators; Nov. 11, 2016; 1 page; The University of Alabama OTT, Center for Advanced Vehicle Technologies.

* cited by examiner

*Primary Examiner* — Hung Q Nguyen
(74) *Attorney, Agent, or Firm* — Brooks Kushman P.C.

(57) ABSTRACT

A system is provided for automatically shutting down an engine of a portable or handheld device in response to the engine operating while in an enclosed space, such as a garage, shed, room, etc. to prevent dangers associated with carbon monoxide accumulating in the enclosed space. The engine has an oxygen sensor in its exhaust that is configured to detect the presence or absence of oxygen in the exhaust. A fuel injector injects fuel for combustion within the combustion chamber. The oxygen sensor may be a switch producing an associated frequency indicating the presence or absence of oxygen. This frequency can control the fuel injection duration such that as the frequency of switching decreases, the injector injects less fuel. If the frequency continues to decrease even while injection is reduced, the controller can assume the engine is operating in confined spaces and can shut down the engine.

20 Claims, 7 Drawing Sheets

CONTROL STRATEGY FOR AUTOMATIC SHUTDOWN OF ENGINE

TECHNICAL FIELD

This disclosure generally relates to a control strategy for automatically shutting down an engine. In particular, one or more sensors, such as an oxygen sensor in the exhaust and/or a temperature sensor in the intake, outputs signals to a controller which, in turn, commands the engine to shut down based on certain characteristics of those signals.

BACKGROUND

Engines produce carbon monoxide (CO) gas, which is odorless, colorless, and toxic. Inhalation of carbon monoxide can be deadly. Gasoline-powered generators include engines that produce carbon monoxide. If the generator is portable (i.e., can be easily picked up and carried by a user), the user might inadvertently be placed in an enclosed, partially enclosed, or poorly ventilated area in which the carbon monoxide can gather in concentrated amounts. As the engine of the generator continues to operate while contained in the enclosed area, the concentrated amounts of carbon monoxide can become increasingly dangerous for individuals.

Prior art engines may include a carbon monoxide (CO) sensor at an intake of the engine. When this sensor detects carbon monoxide, this indicates the surrounding air for entering the engine is polluted with carbon monoxide. However, CO sensors can have inherent stability issues, can lead to trailing off of signal quality, and are costly. While a CO sensor directly measures the harmful gasses in the surrounding air, the quality and costs of the CO sensor can make this sensor undesirable in certain engine applications.

SUMMARY

In one embodiment, a portable generator includes an engine configured to power an electric energy source. The engine has an intake passage configured to transfer an intake such as air. The engine also has a combustion chamber, and a fuel injector configured to inject fuel into the combustion chamber. An exhaust passage is selectively coupled to the combustion chamber via a valve for selectively transferring exhaust after combustion within the combustion chamber. The generator also includes an oxygen sensor disposed in or adjacent to the exhaust passage and configured to detect an oxygen content in the exhaust. The generator also includes a temperature sensor disposed in or adjacent to the intake passage and configured to detect a temperature of the intake. The generator also includes a controller programmed to shut down the engine based on a comparison of the oxygen content in the exhaust and the temperature of the intake, indicating a size of an enclosed space in which the engine is running.

The oxygen sensor may be a switch-type sensor configured to output a signal in response to a presence of oxygen in the exhaust. The controller may be programmed to command the fuel injector to inject an amount of fuel based on the output of the switch-type sensor, and shut down the engine in response to an increase in the frequency of the signal from the oxygen sensor.

In another embodiment, a system for automatically shutting down an engine includes an internal combustion engine having a combustion chamber and an exhaust passage configured to transfer an exhaust from the combustion chamber. An oxygen sensor is disposed in or adjacent to the exhaust passage and configured to output a signal at a frequency indicating a presence or absence of oxygen in the exhaust (e.g., whether the engine is operating lean or rich). A controller is programmed to (i) command the fuel injector to inject less fuel based on the signal from the oxygen sensor, and (ii) shut down the engine based on an increase in the frequency of the signal from the oxygen sensor.

The oxygen sensor may be a switch-based sensor and the signal is binary, indicating oxygen is either present or absent from the exhaust. Based on this signal, the controller can command a fuel injector to vary the amount of fuel to be input into the combustion chamber, thereby changing the air/fuel ratio. If the oxygen sensor continues to output a signal that oxygen is present in the exhaust, even with fuel being removed from the air/fuel mixture for combustion, then the controller can determine that the amount of oxygen in the surrounding room is decreasing, indicating that the engine is operating in a confined space, and can therefore command the engine to shut down. If, even after reducing the amount of fuel injected, the frequency of switching from the oxygen sensor continues to increase, the controller is programmed to shut down the engine.

In another embodiment, a system for automatically shutting down an engine includes an internal combustion engine having an intake passage configured to supply an intake to a combustion chamber in the engine. A temperature sensor is disposed in or adjacent to the intake passage and is configured to output a signal indicating a temperature of the intake. A controller is programmed to shut down the engine in response to a rate of change of the temperature of the intake exceeding a threshold. An increase in temperature of the intake at a rate that exceeds the threshold indicates that the temperature of the surrounding air is increasing at a rate that would indicate that the engine is operating in a confined space or enclosure. The controller commands the engine to shut down accordingly.

BRIEF DESCRIPTION OF THE DRAWINGS

FIGS. 2A-2B is a schematic of a two-stroke engine with various sensors coupled to a controller programmed to perform actions described herein, according to one embodiment, in which FIG. 2A illustrates the engine in an induction and compression phase, and FIG. 2B illustrates the engine in an ignition and exhaust phase.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
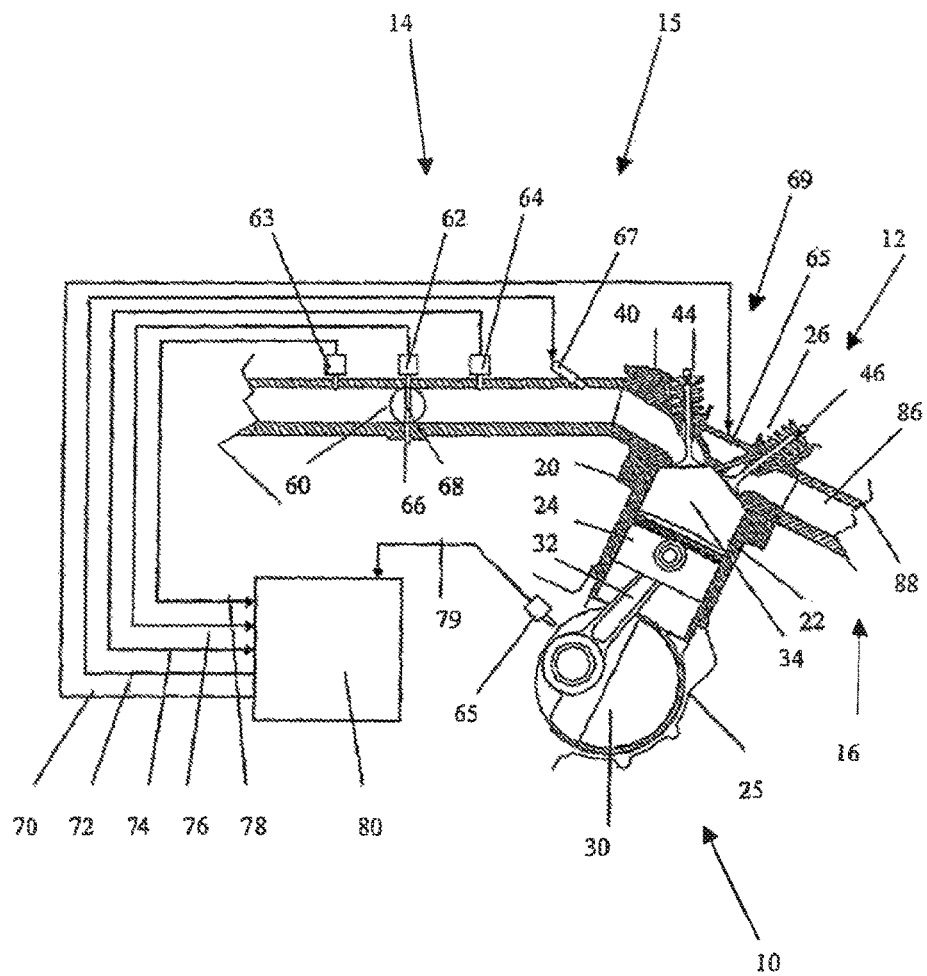
FIG. 1 is a schematic of a four-stroke engine with fuel injection and various sensors coupled to a controller programmed to perform actions described herein, according to one embodiment.

FIG. 1 shows one embodiment of an internal combustion engine 10. The engine 10 may be configured and sized for small-engine applications such as a portable generator, lawn and garden tools (e.g., weed trimmers, blowers, etc.) and the like. The illustrated engine 10 is but one embodiment of a four-stroke engine in which the engine operates on a four-stroke combustion cycle. The engine includes a cylinder block 20, which defines a cylinder bore 22. A piston 24 reciprocates in the cylinder bore 22. A cylinder head assembly 26 is affixed to one end of the cylinder block 20 and defines a single combustion chamber 34 with the piston 24 and cylinder bore 22. Both ends of the cylinder block 20 are closed with a crankcase member (not shown) defining a crankcase chamber 25 therein.

The engine includes an air induction system 14 and an exhaust system 16. The air induction system 14 is configured to supply air charges to the combustion chamber 34. An air intake passage 40 is opened and closed by an intake valve 44. When the intake passage 40 is opened, air form the intake passage (e.g., the pipe or passage extending to the left of the intake passage 40) flows into the combustion chamber 34.

A throttle body may also be provided with a throttle plate 60 for pivotal movement about an axis 66 of a throttle shaft 68, which extends generally vertically through the throttle body. A throttle position sensor 62 is located approximate the throttle shaft 68. A signal from the throttle position sensor 62 is sent to an engine control unit (ECU) or controller 80 via a throttle position data line 76 for use in controlling various aspects of engine operation include, for example, fuel injection control and ignition timing. Such control is described in U.S. Pat. No. 7,225,793 ("the '793 Patent"), which is hereby incorporated by reference in its entirety.

In operation, air is introduced into the powerhead 12 and passes through the inlet opening of the plenum chamber. During operation of the engine 10, an air charge amount is controlled by the throttle plate 60 to meet requirements of the engine 10. The air charge then flows through the runner into the intake passage 40. As described above, the intake valve 44 may be provided at the intake passage 40. When the intake valve 44 is opened, the air is supplied to the combustion chamber 34 as an air charge. Under idle running condition, the throttle plate 60 may be generally closed. The air, therefore, enters the intake passage 40 through the idle air adjusting unit (not shown) which is controlled by the controller 80. The idle air charge adjusted in the adjusting unit is then supplied to the combustion chamber 34 via the intake passage 40. The speed (rpm) of the engine 10 at idle may be adjusted by varying the small opening in the throttle plate 60. This is accomplished by adjusting a set screw (not shown) to limit the lower travel of the throttle plate 60 about axis 66.

The exhaust system 16 is configured to discharge burnt gases, or exhaust gases, from the engine's 10 combustion chamber 34. The exhaust port 86 is defined by the cylinder head assembly 26 and is opened and closed by the exhaust valve 46. When the exhaust port 86 is opened, the combustion chamber 34 communicates with a single exhaust pipe or exhaust passage 88, which guides the exhaust gases downstream through the exhaust system 12.

A single camshaft (not shown) may be provided to control the opening and closing of the intake valve 44 and the exhaust valve 46. The camshaft may have cam lobes that act against valves 44, 46 at predetermined timing in relation to the crankshaft 30 to open and close the intake passage 40 and exhaust port 86. The camshaft is journaled in the cylinder head assembly 26 and may be driven by a chain (not shown) mechanically connected to the crankshaft 30.

The engine 10 also includes a fuel injection system 15. The fuel injection system 15 may include a fuel injector 67 which has an injection nozzle exposed to the intake passage 40 or intake passage so that fuel is directed toward the combustion chamber 34. The fuel injector may be provided in other locations, such as directly adjacent to the combustion chamber or in the crank case. The fuel injector may therefore inject fuel either directly or indirectly to the combustion chamber. A main fuel supply is located in a fuel tank (not shown) from which fuel is supplied via fuel system (not shown). Fuel is dawn from the fuel tank through a fuel filter (not shown) by a fuel pump (not shown). The pressure of the fuel is regulated by a fuel pressure regulator (not shown) and the fuel is sent to the fuel rail (not shown) and provided to the injector 67 for injection into the combustion chamber 34. Excess fuel that is not used by the injectors is fed through a fuel return line that is provided back to the fuel tank. The timing and duration of the fuel injection pulse may be dictated by the controller 80, as described in the '793 Patent.

The fuel charge from the fuel injector 67 enters the combustion chamber 34 with an air charge at the moment the intake valve 44 is opened. Since the fuel pressure is regulated by the pressure regulator, a duration during which the nozzles of the injector 67 are opened is determined by the controller 80 to measure the amount of fuel to be injected by the fuel injector 67. The controller 80 through the fuel injector control line 72 thus controls the duration and the injection timing. Preferably, the fuel injector 67 has nozzles that are opened by solenoid action, as is known in the art. Thus the fuel injector control line 72 signals the solenoids to open and close according to the timing and duration determined by the controller 80.

The engine 10 further includes an ignition system, generally indicated by reference to numeral 67. A spark plug 65 is fixed to the cylinder head assembly 26 and is exposed to the combustion chamber 34. The spark plug 65 ignites the air and fuel charge mixture in the combustion chamber 34 with timing as determined by the controller 80. For this purpose, the ignition system 69 may include an ignition coil (not shown) interposed between the spark plug 65 and the spark plug control line 70.

The engine 10 also may have an AC generator (not shown) for generating electrical power. Additionally, the engine 10 may have a battery (not shown) for storing electrical energy from the AC generator and to supply power to the controller 80, the engine sensors (intake air temperature sensor 63, throttle position sensor 62, intake air pressure sensor 64, crankshaft position sensor 65), fuel pump, fuel injector 67, and the ignition coil.

A crank position sensor 65 may be provided to measure the crank angle and send it to the controller 80. In the illustrated embodiment, the crank position sensor 65 is in the form of a crank trigger, which is configured to emit a single pulse for each revolution of the crankshaft 30. The signal from the crank position sensor 65 is transmitted to the controller 80 via a crank position data line 79. Engine load can be sensed by the angle of the throttle plate 60, and is sensed by the throttle position sensor 62 and is transmitted to the controller 80 via the throttle position data line 76.

An intake air temperature sensor 63 measures the temperature of the incoming air in the intake (e.g., upstream of the throttle). The signal from the intake air temperature sensor 63 is transmitted to the controller 80 via the intake air temperature data line 78. An intake air pressure sensor 64 is connected to the intake runner between the throttle plate 60 and the intake passage 40 and measures the pressure of the incoming air charge in the induction air passage. The measurement of the intake air pressure sensor 64 is transmitted via the intake air pressure data line 74 to the controller 80.

The controller 80 computes and processes the detected signal from each sensor based on a stored control map. The controller 80 forwards control signals to the fuel injector 67 and spark plug 65. Respective control lines 70, 72 are indicated schematically in FIG. 1, which carry the control signals.

While not shown herein, an oxygen (O$_2$) content sensor may be provided on, in, or adjacent to the exhaust passage 88. This type of sensor is, however, illustrated in FIGS. 2A-2B described below. The oxygen sensor is configured to detect the content of oxygen in the exhaust gas and transmit a signal representing such content to the controller 80.

Figure 2A:
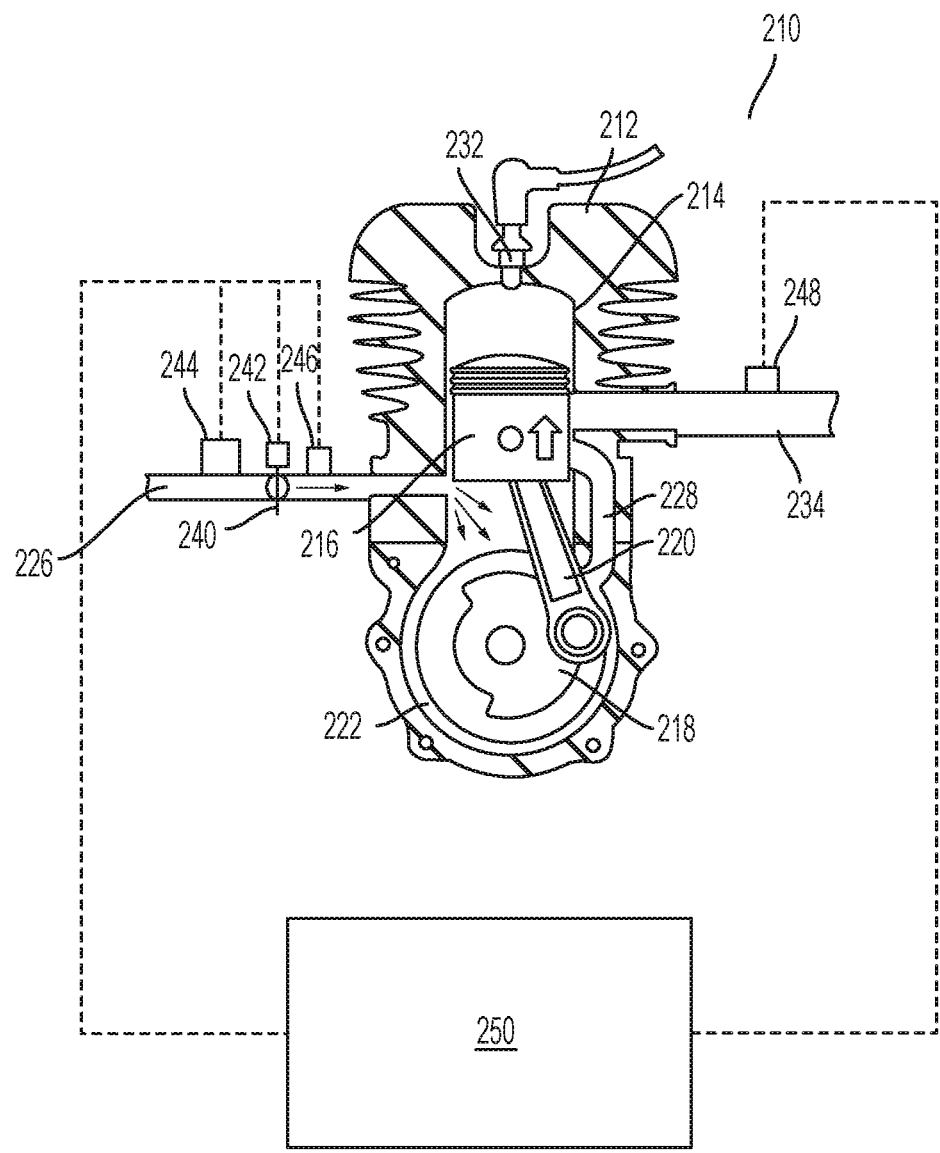
Figure 2B:
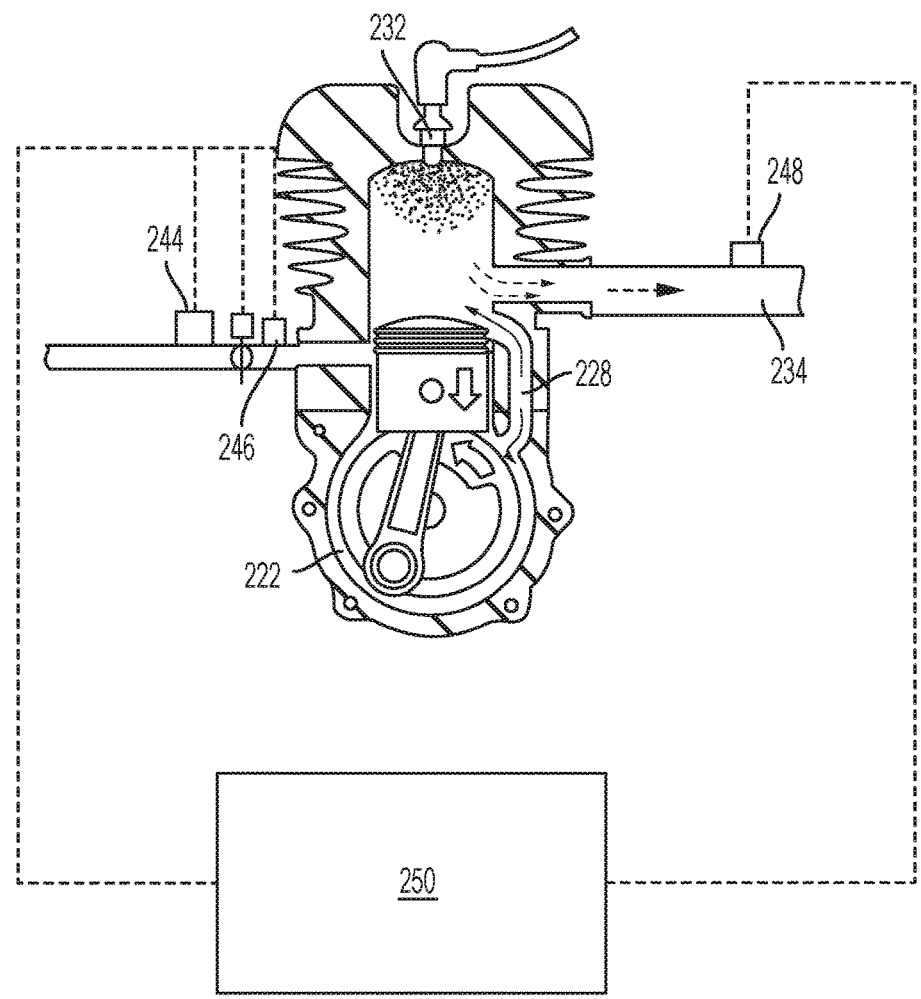

The embodiment described with reference to FIG. 1 is but one embodiment of a four-stroke engine. FIGS. 2A-2B below describe a two-stroke engine that may utilize the teachings of the present disclosure.

FIGS. 2A and 2B show one example of an internal combustion engine 210. The engine 210 may be configured and sized for small-engine applications such as a portable generator, lawn and garden tools (e.g., weed trimmers, blowers, etc.) and the like. The engine shown in FIGS. 2A and 2B is a two-stroke engine in which two different phases are shown that one of skill in the art would recognize as an induction and compression phase (FIG. 2A) and an ignition and exhaust phase (FIG. 2B), as will be described below.

The engine 210 includes a cylinder block 212 which defines a cylinder bore 214. A piston 216 reciprocates in the cylinder bore 212. Movement of the piston 216 turns a crankshaft 218 via a connecting rod 220 that turns within a crank case 222.

It should be noted that the engine of this disclosure is not limited to that shown in FIG. 2A-2B; the engine may include more than one cylinder, and may be of other types (V-type, Inline, W-type, etc.). Also, while the engine shown in FIGS. 2A-2B is a two-stroke engine, where appropriate the engine may also be a four-stroke engine such as that described above.

The engine 210 includes an inlet port or intake passage 226 configured to transfer an air/fuel mixture from a manifold into a cavity of the engine, such as the crank case 222. When the side wall of the piston is above the end or opening of the intake passage 226, as shown in FIG. 2A, the intake passage is open and the air/fuel mixture can enter the crank case 222. When the side wall of the piston covers the end or opening of the intake passage 226, as shown in FIG. 2B, the intake passage is closed and the air/fuel mixture is prevented from entering the crank case 222. The combination of the piston and the intake passage therefore operates as a valve to selectively allow the air/fuel mixture to enter the crank case 222. In other embodiments, a reed valve may also be present in the intake passage to selectively allow the air/fuel mixture into the crank case 222.

A transfer port 228 fluidly couples the crank case 222 to a combustion chamber 230 that is defined within the cylinder bore above the head of the piston 216. The sidewall of the piston 216 covers the transfer port 228 in FIG. 2A such that the air/fuel mixture is prevented from entering the combustion chamber at the end of compression and the moment of ignition and combustion. The engine may include a spark plug 232 to ignite the compressed air/fuel mixture by an electric spark during the ignition phase.

The engine 210 is also provided with an exhaust passage 234 that is configured to transport the resultant gases from combustion out of the combustion chamber 230. During the ignition and exhaust phase shown in FIG. 2B, the piston has moved down so that the sidewall of the piston covers the intake passage or intake passage 226, but has opened the exhaust passage 234. When the piston travels down far enough, the piston also opens the exit of the transfer port 228 to allow the air/fuel mixture to enter the combustion chamber 230.

The intake passage 226 may be provided with a throttle assembly or throttle body such as that disclosed in the '793 Patent. The throttle 240 may include a throttle plate that pivots about an axis and is operated by a throttle cable. Opening the throttle plate at various angles controls the amount of air/fuel mixture entering the crank case 222. A throttle position sensor 242 may be provided in or adjacent to the intake port or intake passage to send a signal to a controller (described below) relating to the position of the throttle plate, indicating an amount of air/fuel mixture intended or commanded to enter the crank case 222.

The engine and surrounding structure is provided with various sensors. These sensors are electrically connected to send signals to an ECU or controller 250, explained in more detail below. For example, an intake air temperature sensor 242 may be provided in or adjacent to the intake passage for sensing the temperature of the air (or air/fuel mixture) in the intake passage 226 and relaying such data to the controller. The intake air temperature sensor 242 may be provided upstream of the throttle 240, but alternatively or additionally an intake air temperature sensor may be provided downstream of the throttle within in the intake passage 226. An intake air pressure sensor 246 may be provided in or adjacent to the intake passage for sensing the pressure of the air (or air/fuel mixture) in the intake passage 226 and relaying such data to the controller. The intake air pressure sensor 46 may be provided downstream of the throttle 240, but alternatively or additionally an intake air pressure sensor may be provided upstream of the throttle within the intake passage 226.

An oxygen (e.g., O$_2$) sensor 248 may be provided in or adjacent to the exhaust passage 234 for sensing the oxygen content of the exhaust. In one embodiment, the sensor 248 is a switch-type sensor configured to determine the presence or absence of oxygen in the exhaust. In another embodiment, the sensor 248 is configured to detect the percentage of oxygen in the exhaust. In either embodiment, the oxygen sensor 248 may be considered to detect an oxygen content in the exhaust. If provided at the exhaust passage 234 rather than the intake passage 226, the oxygen sensor need not be a wideband oxygen sensor, which may be expensive. However, in some embodiments, a wideband oxygen sensor may be provided on the intake passage 226 to determine the oxygen content of the intake.

The sensors explained above are exemplary and it should be understood that more or less of the sensors may be provided to provide data to the controller 250. While illustrated as a single controller 250, the controller may in fact be part of a larger control system and may be controlled by various other controllers throughout the engine and surrounding structure. Because all of these controllers can be communicatively coupled to one another to issue various commands about the structure (e.g., generator), the word "controller" in the general sense is intended to mean one or more controllers communicatively coupled to one another. This is also true with the controller of FIG. 1.

Furthermore, the controller may be or include a processor or microprocessor or central processing unit (CPU) in communication with various types of computer readable storage devices or media and programmed to perform various actions described herein based on the received signals from the sensors. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine.

The controller may communicate with various engine sensors and actuators (such as those described above) via an input/output (1/0) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIGS. 1-2B, the controller may communicate signals to and/or from the various sensors described above, as well as other sensors, and other associated structure such as a fuel injector, fuel igniting source, etc. Although not explicitly illustrated, those of ordinary skill in the art will recognize various functions or components that may be controlled by controller within at least each of the structures or subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, and the like. Sensors communicating input through the 1/O interface may be used to indicate crankshaft position, engine rotational speed, intake manifold pressure (MAP), ignition switch position, throttle valve position, intake manifold air temperature, exhaust gas oxygen content, or other exhaust gas component concentration or presence, or intake air flow (MAF), for example.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based engine controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Engines, such as the engines 10 and 210, produce carbon monoxide (CO) gas as a byproduct of combustion. Inhalation of carbon monoxide can be deadly. If the engine is part of a portable device such as a generator, lawn equipment, etc., a user might inadvertently place the portable device with its engine running in an enclosed, partially enclosed, or poorly ventilated area where the carbon monoxide can gather in concentrated amounts. As the engine of the generator continues to operate while contained in the enclosed area, the concentrated amounts of carbon monoxide can become increasingly dangerous for individuals. Carbon monoxide sensors can be placed on the engine, but have their inherent deficiencies, including cost.

Therefore, according to various embodiments of this disclosure, a system for determining that the engine is running in an enclosed space is provided. In various embodiments, a CO sensor is not provided. Instead, other sensors (such as those illustrated in FIGS. 1 and 2A-2B) provide data that allow the controller to infer that the engine is in a confined space where concentrated carbon monoxide may become hazardous. And, the controller can estimate the size of the enclosed space based on, for example, a determination of the oxygen content of the exhaust and/or the temperature of the intake. These and additional embodiments are provided below.

With reference to FIGS. 3-6 described, below, references to the controller and various sensors are made. It should be understood that these references can refer to the controller and various sensors of either FIG. 1 (in the case of a four-stroke engine) or FIGS. 2A-2B (in the case of a two-stroke engine).

Figure 3:
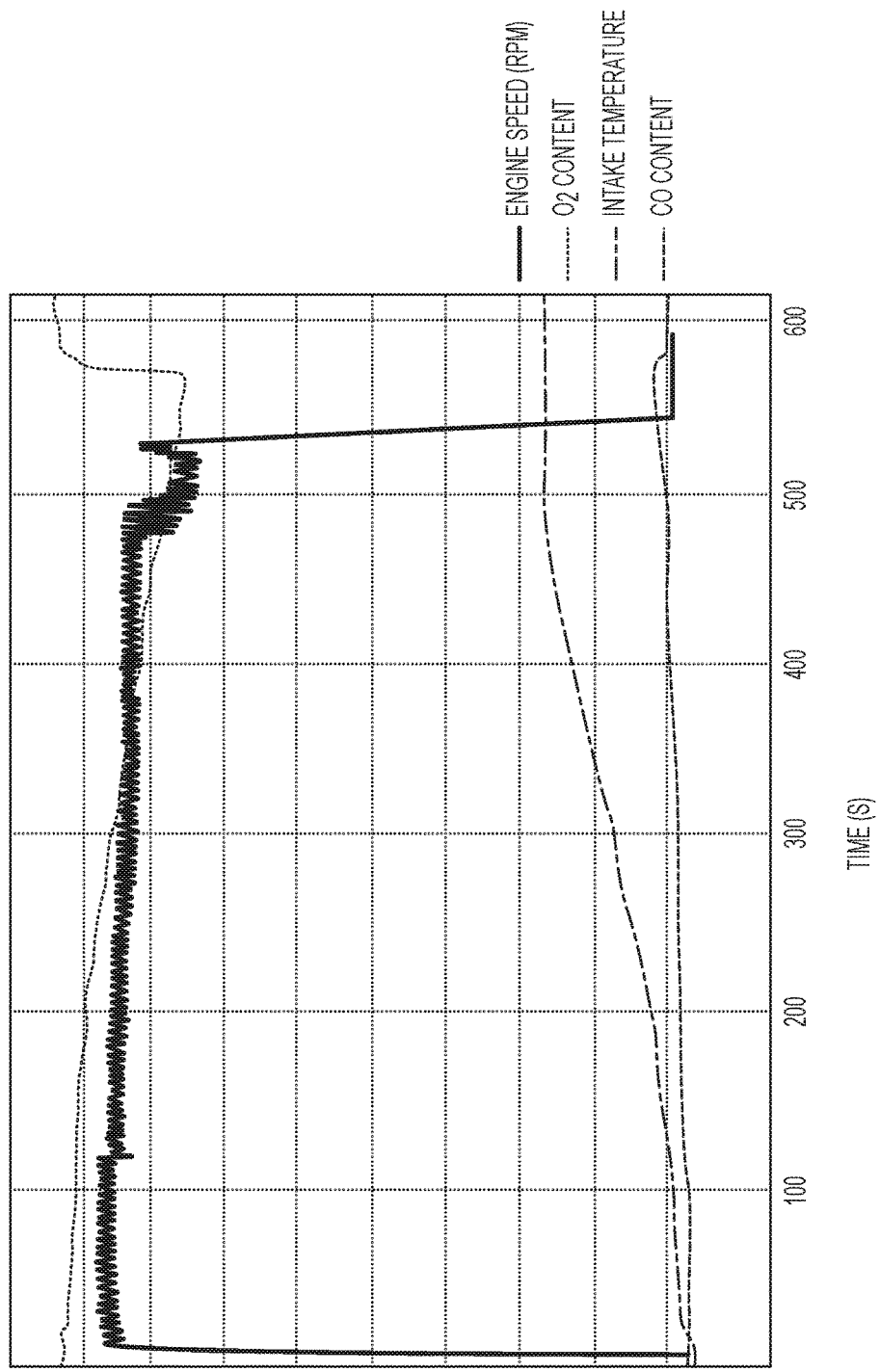
FIG. 3 is a graphical representation of a comparison of engine speed, oxygen content in the intake or surroundings, an intake temperature, and a carbon monoxide content in the intake or surroundings, when the engine is operating in a confined space or enclosure, according to one embodiment.

Before explaining various embodiments of algorithms employed by the controller, a comparison of data received by the controller is illustrated in FIG. 3. FIG. 3 shows a comparison of engine speed (RPM), oxygen content in the intake (e.g., surrounding environment), temperature of the intake, and carbon monoxide content. The engine of a generator producing the data shown in FIG. 3 is placed in a confined space in which carbon monoxide can potentially accumulate to a hazardous level. While the engine itself may not include a CO sensor or an oxygen sensor at the intake (as explained above), the content of the CO in the air is shown in the graph for comparative purposes.

At approximately t=0, the engine is started. The speed of the engine (RPM) is determined from a crankshaft position sensor, or from air pressure as explained in the '793 Patent. The controller also receives information regarding the oxygen content of the exhaust (and, in some embodiments, the intake), provided by the oxygen sensors. The controller also receives information regarding the temperature of the intake air from the intake air temperature sensor. While not illustrated herein, the controller may also receive data indicating other information such as the throttle angle from the throttle position sensor, power (e.g., watts, amps) output from the generator, air pressure received from the intake air pressure sensor, air mass volume or flow rate from an associated sensor, etc.

Once the engine is started, the oxygen content of the intake is shown to begin decreasing. At approximately t=120 s, a noticeable decrease in engine speed is illustrated, indicating the door or opening of the room being shut to further enclose the engine in its surrounding environment. The rate of decrease of the oxygen may be slight or constant at first, but after approximately t=200 s a larger rate of decrease of the oxygen can be noted. This can indicate the engine is in a confined space. As the oxygen content of the intake decreases, it can be inferred that the oxygen coming into the engine through the intake is correspondingly decreasing due to the increased amount of CO. Likewise, the temperature of the intake is increasing. This can lead the controller to infer that the engine is in a confined space where ventilation is not provided, which would be indicated by a constant temperature regardless of the engine running.

Utilizing the data indicating the negative rate of change of the oxygen content, the controller can determine a size (e.g., volume) of the enclosure surrounding the engine and can shut down the engine accordingly. Temperature changes can be utilized as confirmation of the shutdown, in some embodiments. For example, if the controller determines that the oxygen content is decreasing at a rate of 1% per 100 seconds, and the intake temperature is increasing at a rate of 1 degree Celsius per 100 seconds, the controller may determine that the enclosed space around the engine is approximately 500 cubic feet. In another example, if the controller determines that the oxygen content is decreasing at a rate of 0.5% per 100 seconds, and the intake temperature is increasing at a rate of 0.5 degrees Celsius per 100 seconds, the controller may determine that the enclosed space is approximately 2000 cubic feet. The controller may communicate with a stored lookup table in the associated memory that provides a volume that corresponds to a rate of change of both the oxygen content and the temperature from previous testings.

In one embodiment, the size of the enclosure or room can be estimated with the oxygen sensor alone without utilizing data from the air temperature sensor, as explained in more detail below.

At approximately t=475 s, the engine speed begins to oscillate abruptly due to the decreased amount of oxygen in the air, yielding undesirable combustion characteristics. The engine then stalls at about t=520 s due to the oxygen content dropping to an unworkable level. For example, ambient air might have a normal oxygen content of 21%; however, when the oxygen content reaches approximately 17-18%, this might force the engine to stall, depending on the characteristics of the engine.

While the above embodiment takes roughly 520 seconds for the engine to stall, the carbon monoxide content in the air might already be lethal. For example, a level of 400 parts per million (PPM) of CO content in the air may be lethal. This amount is reached well before the 520 seconds that it takes for the engine to stall. Therefore, it is particularly desirable to be able to shutdown the engine as early as possible, once the controller determines with accuracy that the engine is running in a confined space. Based on the rates of changes of both the oxygen content in the exhaust and the temperature of the intake, the controller may be programmed to automatically shutdown the engine to prevent the carbon monoxide from reaching dangerous levels.

Figure 4:
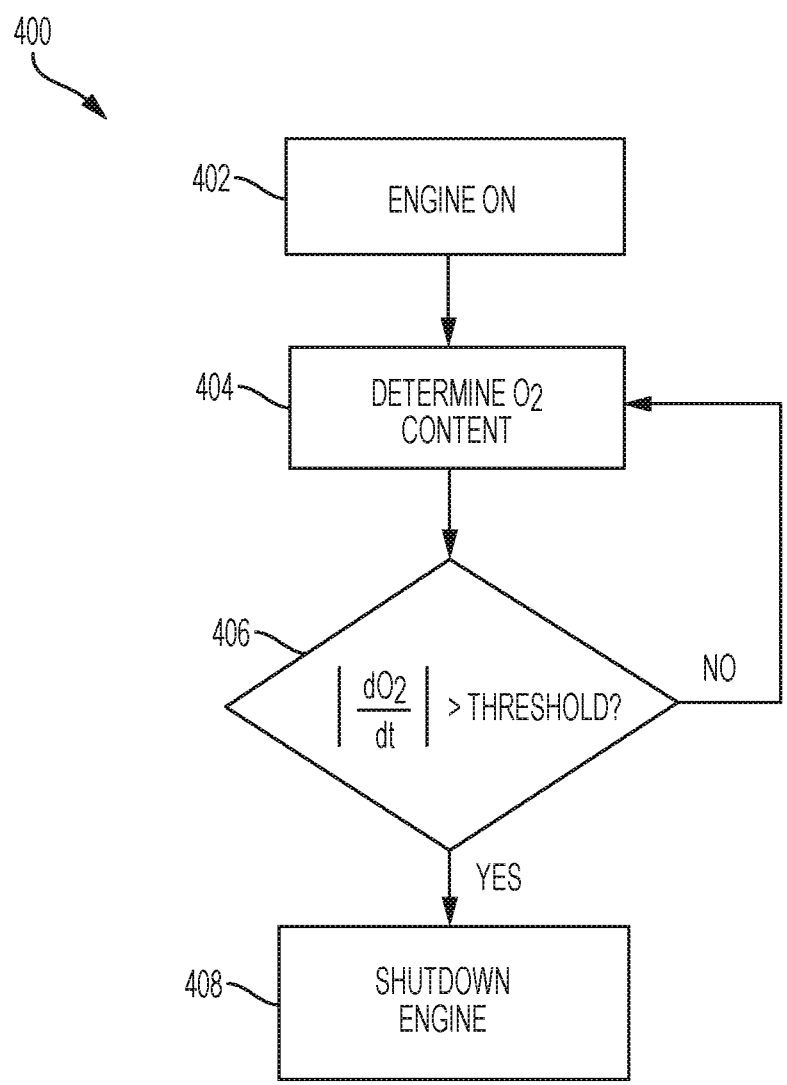
FIG. 4 is a flow chart representing an algorithm performed by the controller according to one embodiment to automatically shut down the engine.

FIG. 4 illustrates an algorithm 400 according to one embodiment that can be implemented by the controller. In this embodiment, the controller can automatically shut down the engine based on the oxygen content of the exhaust alone. At 402, the controller determines that the engine is on and running. This can be determined by, for example, the engine speed sensor as described herein. If the engine is not on, the control can exit the algorithm. At 404, the controller determines the oxygen content in the exhaust, according to the methods described above.

At 406, the controller compares the magnitude or absolute value of the rate of change of the oxygen $$\left(\left|\frac{dO_2}{dt}\right|\right)$$

to a corresponding oxygen rate of change threshold. If the oxygen content of the exhaust is changing at a rate that exceeds a threshold, then the controller commands the engine to shut down at 408. In one example, the threshold is 1% per 100 s. However, the threshold can vary based on the determined size of the room, which may be influenced by the rate of decrease or amount of the oxygen and the rate of increase of the temperature of the intake.

If the oxygen sensor is a switch-based sensor (as described in more detail herein), the rate of change of the oxygen content of the exhaust can be determined by the amount of time that the switch takes to switch. For example, if the calculated fuel mass is too large, the system will take longer to switch lean. If the calculated fuel mass is too little, it will take longer to switch rich. The change in oxygen content in the air can therefore be indicated by the frequency or time it takes the oxygen sensor to switch. This indicates that oxygen content is increasing in the exhaust.

The algorithm of FIG. 4 is but one embodiment. Estimation of the size of the room or enclosure can be performed with the oxygen sensor alone; other data such as a rising temperature may serve as support for the inference that the engine is operating in a confined space. During combustion in a four-cycle engine at stoic, all oxygen in the combustion gases is consumed. The oxygen sensor on the exhaust may be of a switch type. A closed-loop control may be implemented by controlling the air/fuel mixture just slightly rich/lean or stoic and watching the oxygen sensor switch. This may be referred to as a "bang-bang" since a switch type sensor (if utilized on the exhaust) only senses a presence or absence of oxygen in the exhaust. If oxygen is present, the engine is running rich; if not, the engine is running lean. Effectively, the control loop verifies that the air mass (and matching fuel mass) is correct. If the calculated fuel mass is too large, the system will take longer to switch lean. If fuel is too little, it would take longer to switch rich. Meanwhile, the controller is incrementally changing the air/fuel ratio up and down (e.g., by adjusting fuel injection opening duration) by small amounts and looking for the oxygen sensor in the exhaust to switch. The incremental change in the air/fuel ratio are to attempt to maintain the combustion at a stoichiometric ratio.

Negative $O_2$ correction is utilized to remove fuel from the system to maintain stoic. Negative $O_2$ correction is noticeable in confined space, such as disclosed herein. If it is assumed that fresh air is about 21% oxygen, and if the controller utilizes a speed-density air mass measurement, the controller calculates the air mass per engine cycle. If the oxygen sensor switches at a lengthier time, a negative $O_2$ correction can occur in which less fuel is injected to maintain stoic. Speed density equations can take into account temperature and pressure of the air so that the data is normalized. If the controller notices a negative $O_2$ correction occurring, this infers that the air is "thinner" or has less oxygen content than expected. This indicates that the engine is operating in a confined space, and the engine can be commanded to automatically shut down. A negative $O_2$ correction can be inferred by monitoring patterns of the output of the oxygen sensor (e.g., the frequency of the switching from the oxygen sensor reducing over time) or patterns of the amount of fuel injected (e.g., less and less fuel being commanded to be injected over time).

Therefore, in one embodiment, the oxygen sensor is a switch type, indicating the presence or absence of oxygen in the exhaust by outputting a signal having a corresponding frequency. Based on a presence of oxygen in the exhaust, the controller alters the fuel injection opening or timing such that less fuel is provided into the combustion chamber (e.g., to maintain stoic). In other words, fuel is removed from the air/fuel mixture. This is a negative $O_2$ correction. Based on a negative $O_2$ correction occurring over time, or causing the fuel injection to inject an amount of fuel per cycle that is below a threshold, the controller commands the engine to automatically shut down based on an inference that the engine is operating in a confined space in which oxygen is being depleted from the confined space. In an embodiment, the controller can command the fuel injector to inject less fuel in response to the frequency from the oxygen sensor decreasing (i.e., taking longer to switch), and can command the engine to shut down in response to the frequency continuing to decrease beyond a threshold even after the fuel injector is injecting less and less fuel.

As explained, estimation of the size of the enclosure or room surrounding the engine may be made with only the oxygen sensor, and not relying on data from other sensors such as the intake temperature sensor. For example, in one embodiment (with rounded numbers for ease of understanding), the engine is a 500 cc (0.0005 cubic meter) engine, and the room volume is 10 cubic meters. For each combustion event of roughly 500 cc, all of the $O_2$ is consumed before being pushed back into the room. As this occurs over time, the amount of $O_2$ in the room by volume decreases as it is exchanged for other chemical compounds (like CO and $CO_2$). Because the exhaust is recirculating to the intake, the amount of $O_2$ in the room is not a linear calculation. However, all $O_2$ in the cylinder during combustion is consumed. For the first combustion event, it can be assumed that 500 cc (0.0005 cubic meters) worth of air is used (0.005% of the room), and thus roughly 21% of that air is $O_2$ that is being consumed. That same amount of $O_2$ is being removed from the enclosure. Therefore, the rate of depletion of oxygen directly translates to an estimated size of the room. Knowing the rate of change in $O_2$ due to each combustion event as well as the displacement of the engine allows the controller to estimate the room size of 10 cubic meters.

While the use of timers is explained herein, it should be understood that such use is only in certain embodiments. In various embodiments, an estimation of the size of the room as described herein is not related to setting a timer to shut down; as soon as the controller determines the size of the room based on the exemplary methods described herein, the engine can be immediately shut down.

Figure 5:
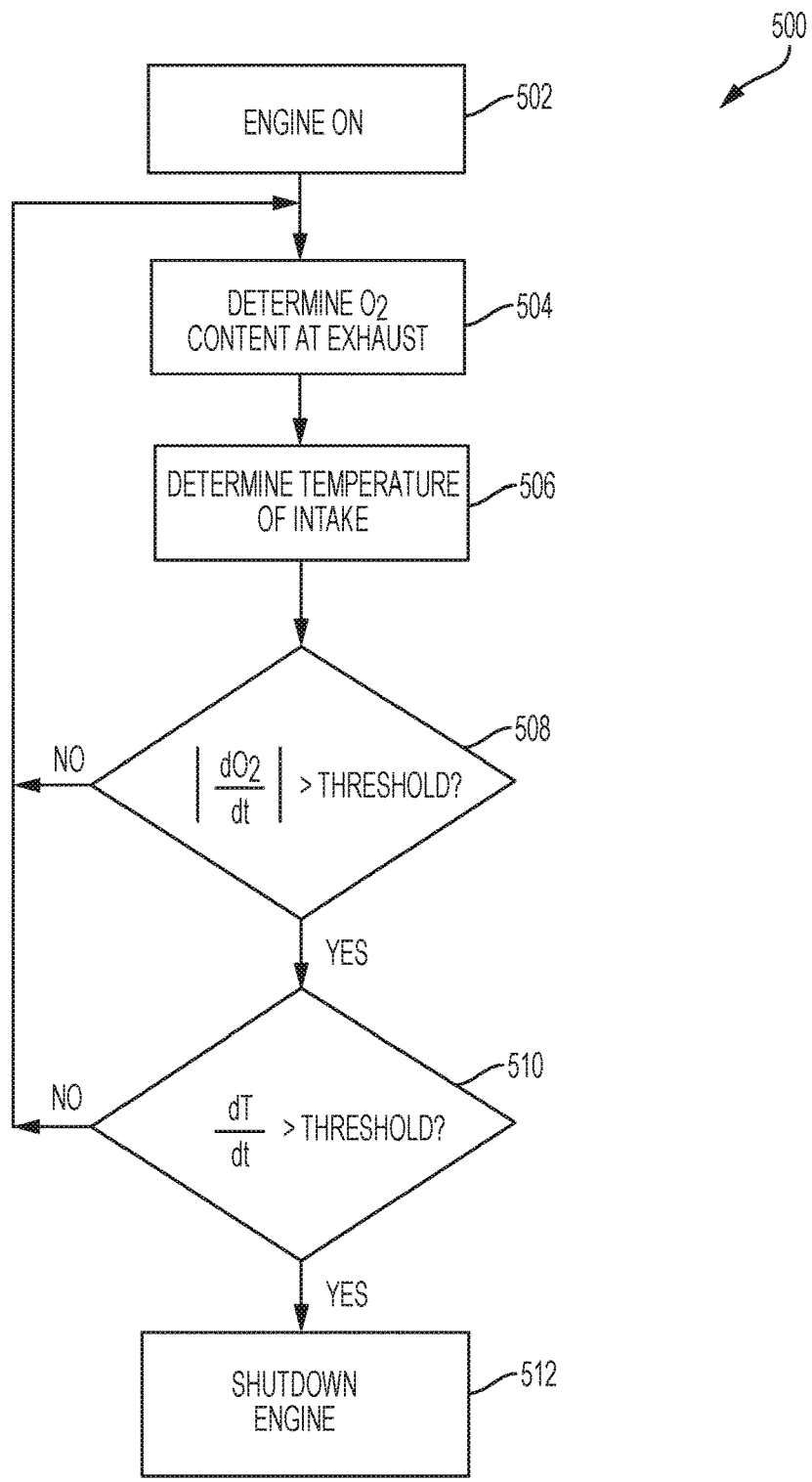
FIG. 5 is a flow chart representing an algorithm performed by the controller according to another embodiment to automatically shut down the engine.

FIG. 5 provides another example of an algorithm employed by the controller for automatically shutting down the engine. At 502, the controller once again determines if the engine is running to initiate the algorithm. At 504, the oxygen content of the exhaust is again determined according to the methods described herein. At 506, the temperature of the intake is determined according to methods described herein.

At 508 the controller compares the rate of change of the oxygen content $$\left(\left|\frac{dO_2}{dt}\right|\right)$$

to a corresponding threshold, similar to the methods explained above. For example, the oxygen sensor may be a switch-type sensor described above and the negative $O_2$ correction described above may be indicating the engine is running in a confined space. If negative $O_2$ correction is seen occurring, this too is contemplated as meaning that the oxygen content is changing at a rate that exceeds a threshold. If the oxygen content is changing at a rate that exceeds the threshold, the algorithm proceeds to 510 in which the controller compares the rate of change of the temperature $$\left(\left|\frac{dT}{dt}\right|\right)$$

to a corresponding threshold. The threshold may be, for example, 1 degree per 100 seconds. Again, this threshold may vary based on the determined size of the room.

In this embodiment, both the oxygen content of the exhaust and the temperature of the intake must be changing at a rate exceeding respective thresholds in order for the engine to be automatically shut down at 512. This may provide an increased assurance that the engine is operating in a confined space than merely looking at one variable alone.

Comparing exhaust oxygen content and intake temperature are not the only embodiments contemplated herein. The controller can also compare a change in load on the engine and a change in power output of the generator run by the engine. If the load on the engine is increasing while a power output by the generator is decreasing, this may indicate the engine is operating in a confined space.

Figure 6:
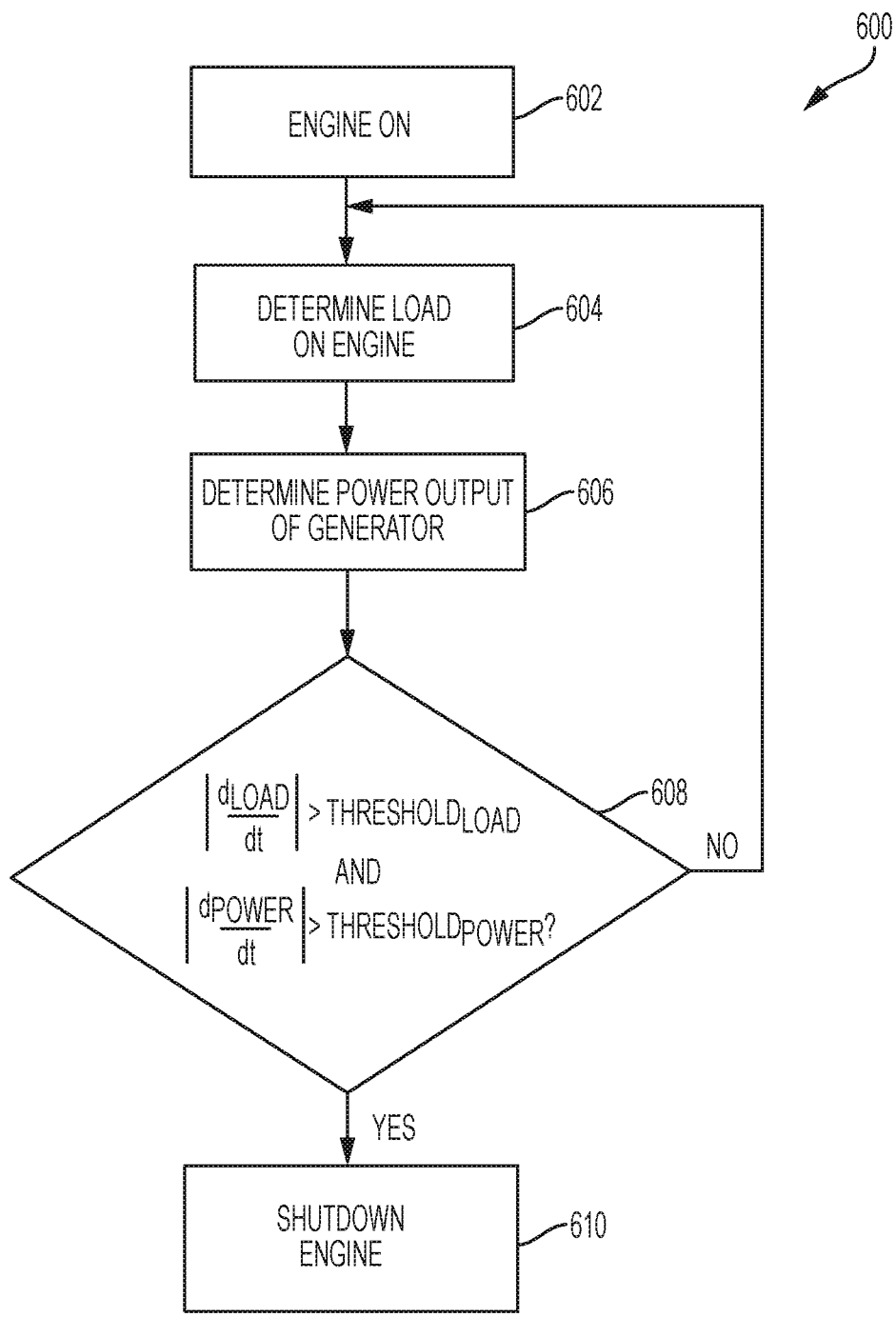
FIG. 6 is a flow chart representing an algorithm performed by the controller according to another embodiment to automatically shut down the engine.

FIG. 6 provides another embodiment of such an algorithm 600 to shut down the engine. At 602, the controller determines that the engine is on. At 604, the controller determines the load placed on the engine. This may be provided by the pressure sensor on the intake (as disclosed in the '793 Patent, for example). A decrease in air pressure entering the intake may indicate an increased load on the engine. The throttle position sensor may also indicate load, as an increased (e.g., more open) position of the throttle plate to allow more air/fuel to enter the crank case may be necessary to do the increased load on the engine. A decrease in air mass volume measurement from an associated sensor may also indicate an increased load.

At 606, the controller determines the power output of the portable generator. This may be provided by a sensor indicating watts or amps produced by the generator.

At 608, the controller compares the absolute value of the rate of change of the load placed on the engine $$\left(\left|\frac{dLOAD}{dt}\right|\right)$$

to a respective threshold, and the rate of change of the power output from the generator $$\left(\left|\frac{dPOWER}{dt}\right|\right)$$

to a respective threshold. If the magnitude of the rate of change of the load placed on the engine exceeds its corresponding load threshold (threshold$_{LOAD}$) and the rate of change of the power exceeds its corresponding power threshold (threshold$_{POWER}$), the controller infers that the engine is operating in a confined space. In short, in one embodiment, if the throttle is opening more and more to allow more air into the combustion chamber, and the amount of power is either decreasing or not correlating to an expected power output in response to the opening of the throttle, the controller can shut down the engine. The controller can also determine the size of the room by utilizing a lookup table that provides an estimated volume of the enclosed space based on these rates of change. If the engine is indeed operating in the confined space, the controller shuts down the engine at 610.

In one or more embodiments, and as explained above, the switching of the oxygen sensor (e.g., sensor 248) may be analyzed to determine whether to automatically shut down the engine. For example, the output of the oxygen sensor (e.g., voltage) may fluctuate between a reading indicating a rich air/fuel mixture (e.g., high voltage output) and a reading indicating a lean air/fuel mixture (e.g., low voltage output). This oscillation may be between 0.15V and 0.85V with a frequency of 1 Hz. A change in this frequency as well as the time in which the output remains either rich or lean can be analyzed by the controller, as explained above. As oxygen is depleted, the air/fuel mixture becomes more and more rich, and therefore the amount of time that the oxygen sensor's output remains at a level indicating a rich air/fuel mixture will increase. So, in one embodiment, the controller can be programmed to shut down the engine in response to the voltage output of the oxygen sensor remaining at a level indicating a rich air/fuel mixture for a time exceeding a threshold, even while still oscillating between rich and lean. Furthermore, the number of cycles or time between the switches or oscillations of the oxygen sensor can be utilized by the controller. For example, if the output from the oxygen sensor indicates that the switch is remaining in one state (e.g., rich) for a length of time exceeding a programmable threshold, the controller can command the engine to shut down.

While not illustrated, other embodiments of automatic engine shutdown and determinations of room size are contemplated. For example, the controller may compare an increase in throttle angle position (e.g., opening) to a decrease in engine speed. If the throttle angle position is opening at a rate exceeding a threshold, and the absolute value of the decrease in engine speed is decreasing at a rate exceeding a threshold, the controller can infer the engine is operating in an enclosed space. The intake air temperature can also be added to this embodiment, such that it also may be necessary that the intake air temperature is increasing at a rate exceeding a threshold to cause the engine to shut down.

In another embodiment, air temperature alone is evaluated. For example, if the intake temperature is increasing at a rate exceeding a threshold that may be dependent on the determined room size, the engine may shut down. Alternatively or additionally, the controller may be programmed to automatically shut down the engine when the temperature itself exceeds a threshold (e.g., 140 degrees Celsius) even if the rate is increasing slowly at a rate that does not exceed the threshold.

As explained above, a wideband oxygen content sensor may be provided on the intake in certain embodiments. The readings of this sensor alone can cause the controller to shut down the engine. For example, if the wideband $O_2$ sensor indicates that the oxygen content in the intake (and thus the surrounding air) is less than a predetermined value such as 21% oxygen, then the controller can assume the engine is being operated in a confined space and can automatically shut down the engine. The predetermined value may be other set limits lower than 21% oxygen according to different applications. For instance, some control strategies may place the predetermined value at 19% oxygen.

In one or more embodiments explained above, time may also be a factor to determine when to shut down the engine. For example, if the rate of change of a certain value (e.g., oxygen content, temperature, etc.) is exceeding its threshold, the engine will not shut down unless the rate of change is exceeding the threshold for a certain time. In other words, a time delay or hysteresis may be provided to the values to prevent shutdowns at improper times when the engine may, in fact, not be operating in an enclosed space. Said another way, once it is determined that the engine is running in an enclosed space according to any of the embodiments described above, the controller may not shut down the engine until it is determined that the engine is running in the confined space for a certain time.

While certain embodiments described above may be directed to portable generators, it should be understood that the present disclosure is not limited to portable generators. The teachings of this disclosure can be implemented into various structures with small (e.g., two-stroke) engines. The teachings of this disclosure can also be implemented into four-stroke engines.

In certain embodiments, it may be useful to use as little number of sensors as possible for shutting off the engine. In direct injection engines, there may be many sensors that provide a variety of data. However, in carburetor engines or small two-stroke engines, the same amount of data capabilities may not be possible. Therefore, according to some embodiments, the controller may be programmed to shut down the engine based on a determination that the engine is in a confined space indicated by the temperature and/or the oxygen content alone, without other information being necessary for such a procedure. For example, in one embodiment, the controller is programmed to estimate the size of the room and shut down the engine based on the oxygen sensor alone. In another embodiment, the controller is programmed to estimate the size of the room and shut down the engine based ont eh temperature sensor alone.

Typical fuel systems clog or degrade with age, which requires a need for positive $O_2$ correction, or the addition of fuel to maintain stoic. To quite the contrary, the control system of this disclosure can use negative $O_2$ correction, or a removal of fuel, to maintain stoic. Negative $O_2$ correction has been explained above, in which the controller controls the air/fuel mixture just slightly rich/lean of stoic and altering the mixture based on switching of a switch-based oxygen sensor on the exhaust. Negative $O_2$ correction requires a lowering and lowering of fuel sent to the combustion chamber in order to maintain a stoic combustion.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A portable generator comprising:
    an engine configured to power an electric energy source, the engine having an intake passage configured to transfer an intake, a combustion chamber, a fuel injector for injecting fuel into the combustion chamber, and an exhaust passage selectively coupled to the combustion chamber and configured to transfer an exhaust after combustion within the combustion chamber;
    an oxygen sensor disposed in or adjacent to the exhaust passage and configured to detect an oxygen content in the exhaust;
    a temperature sensor disposed in or adjacent to the intake passage and configured to detect a temperature of the intake; and
    a controller programmed to shut down the engine based on a comparison of the oxygen content in the exhaust and the temperature of the intake, indicating a size of an enclosed space in which the engine is running.

2. The portable generator of claim 1, wherein the oxygen sensor is a switch-type sensor configured to detect a presence or absence of oxygen in the exhaust.

3. The portable generator of claim 2, wherein the controller is programmed to command the fuel injector to inject an amount of fuel based on an output of the switch-type sensor and shut down the engine in response to an amount of fuel being injected reducing over time.

4. The portable generator of claim 1, wherein the portable generator does not include a CO sensor configured to detect an amount of CO in the exhaust.

5. A system for automatically shutting down an engine, the system comprising:
    an internal combustion engine having a combustion chamber and an exhaust passage configured to transfer an exhaust gas from the combustion chamber;
    an oxygen sensor disposed in or adjacent to the exhaust passage and configured to output a signal at a frequency indicating a presence or absence of oxygen in the exhaust gas;
    a fuel injector configured to inject fuel such that the fuel is delivered to the combustion chamber; and
    a controller programmed to (i) command the fuel injector to inject less fuel based on the signal from the oxygen sensor, and (ii) shut down the engine based on a decrease in the frequency of the signal from the oxygen sensor.

6. The system of claim 5, further comprising a fuel injector,
    wherein oxygen sensor is a binary switch-type sensor, and
    wherein the controller is programmed to perform a negative oxygen correction to command the fuel injector to inject less fuel based on a presence of oxygen in the exhaust gas detected from the oxygen sensor to maintain a stoichiometric combustion, and wherein the controller is programmed to shut down the engine in response to the negative oxygen correction occurring by an amount exceeding a threshold.

7. The system of claim 5, wherein the internal combustion engine further includes an intake passage configured to transfer an intake, the system further comprising a temperature sensor disposed in or adjacent to the intake passage and configured to output a signal to the controller indicating a temperature of the intake, wherein the controller is further programmed command the shut down further based on a change of the temperature of the intake.

8. The system of claim 7, wherein the controller is programmed command the shut down further in response to a positive rate of change of the temperature of the intake exceeding a temperature threshold.

9. The system of claim 7, wherein the controller is programmed to estimate a size of an enclosed space surrounding the engine based on a positive rate of change of the temperature of the intake.

10. The system of claim 5, wherein the command of the fuel injector to inject less fuel based on the signal from the oxygen sensor is done to maintain a stoichiometric ratio of air and fuel.

11. The system of claim 10, wherein the amount of fuel being injected over time falling below a threshold to cause the controller to shut down the engine corresponds to a frequency of switching output by the oxygen sensor.

12. The system of claim 5, wherein the internal combustion engine is a four-stroke engine, wherein the controller is programmed to perform a negative oxygen correction to reduce an amount of fuel injected from the fuel injector based on a presence of oxygen in the exhaust detected from the oxygen sensor and shut down the engine based on the negative oxygen correction.

13. The system of claim 5, wherein the system does not include a CO sensor disposed in or adjacent to the exhaust passage and configured to detect an amount of CO in the exhaust.

14. A system for automatically shutting down an engine, the system comprising:
   an internal combustion engine having an intake passage configured to supply an intake to a combustion chamber in the engine;
   a temperature sensor disposed in or adjacent to the intake passage and configured to output a signal indicating a temperature of the intake; and
   a controller programmed to shut down the engine in response to a rate of change of the temperature of the intake exceeding a temperature threshold.

15. The system of claim 14, wherein the controller is further programmed to determine a size of an enclosed space surrounding the engine based on the rate of change of the temperature of the intake, and wherein the temperature threshold is variable based the size of the enclosed space.

16. The system of claim 15, wherein the engine further includes an exhaust passage configured to transfer an exhaust from the combustion chamber,
   wherein the system further includes an oxygen sensor disposed in or adjacent to the exhaust passage and configured to output a signal indicating a presence of oxygen in the exhaust,
   wherein the system further includes a fuel injector, and
   wherein the controller is programmed to determine the size of the enclosed space based on the rate of change of the temperature of the intake exceeding a temperature threshold and the presence of oxygen in the exhaust causing the fuel injector to reduce an amount of fuel injected over time.

17. The system of claim 16, wherein the controller is programmed to command the shut down further in response to a time exceeding a time threshold while the rate of change of the temperature exceeds the temperature threshold.

18. The system of claim 17, wherein the time threshold is based on the determined size of the enclosed space.

19. The system of claim 14, wherein the internal combustion engine is a four- stroke engine with a fuel injector and an oxygen sensor disposed in or adjacent an exhaust passage, wherein the controller is programmed to perform a negative oxygen correction to reduce an amount of fuel injected from the fuel injector based on a presence of oxygen in the exhaust detected from the oxygen sensor and shut down the engine in response to the negative oxygen correction.

20. The system of claim 14, wherein the system does not include a CO sensor disposed in or adjacent to the exhaust passage and configured to detect an amount of CO in the passage.

* * * * *